CAPACITANCE-MEASURING TECHNIQUE

Original Filed April 14, 1969 3 Sheets-Sheet 1

INVENTOR.
FLOYD L. TIFFANY
BY
Baer, Freeman & Molinare
ATTORNEYS

CAPACITANCE-MEASURING TECHNIQUE

Original Filed April 14, 1969 3 Sheets-Sheet 2

INVENTOR.
FLOYD L. TIFFANY
BY Bair, Freeman & Molinare
ATTORNEYS

CAPACITANCE-MEASURING TECHNIQUE

Original Filed April 14, 1969 3 Sheets-Sheet 3

INVENTOR.
FLOYD L. TIFFANY
BY
Bair, Freeman & Molinare
ATTORNEYS

United States Patent Office

Re. 27,829
Patented Dec. 4, 1973

27,829

CAPACITANCE-MEASURING TECHNIQUES

Floyd L. Tiffany, Marshalltown, Iowa, assignor to Fisher Controls Company, Inc., Marshalltown, Iowa Original No. 3,543,046, dated Nov. 24, 1970, Ser. No. 815,795, Apr. 14, 1969. Application for reissue Sept. 21, 1972, Ser. No. 291,052
Int. Cl. G01f *31/00*
U.S. Cl. 307—118 24 Claims

Matter enclosed in heavy brackets [ ] appears in the original patent but forms no part of this reissue specification; matter printed in italics indicates the additions made by reissue.

ABSTRACT OF THE DISCLOSURE

The relative capacitance of a first capacitor may be accurately measured by providing a second reference capacitor and a switch that cyclically charges and discharges the first and second capacitors at a predetermined rate. The cyclical charging and discharging of the first capacitor produces a first current that is amplified by a first amplifier. The cyclical charging and discharging of the second reference capacitor produces a second current that is amplified by a second amplifier. The first and second currents are algebraically summed and conducted to a comparison device that indicates the relative difference between the capacitance of the first and second capacitors by sensing the magnitude of the summed currents.

BACKGROUND AND SUMMARY OF THE INVENTION

This invention relates to capacitance-measuring techniques, and it is more particularly directed to capacitance-type level-measuring and control devices.

Devices generally capable of monitoring and controlling the level of a liquid or granular substance held in a tank or bin have been used to advantage for many years. In one class of such devices, the level of the substance is monitored by placing a probe comprising a variable capacitor into the tank. If the probe is mounted horizontally at a particular level, the capacitance of the probe changes abruptly as the level of the substance rises and covers the probe. By sensing the change in capacitance, the presence of the substance at the particular level may be detected. If the probe is mounted vertically, the capacitance of the probe is gradually altered as the level rises and covers an increasingly larger proportion of the probe. By sensing the gradual change in capacitance, the level of the substance may be continuously monitored.

A typical circuit presently used to detect a change in probe capacitance comprises an oscillator that has the probe electrically connected to its input circuit. As the probe capacitance changes, the magnitude of the input voltage to the oscillator is varied, and the magnitude of the oscillator output voltage is altered accordingly. The oscillator output voltage is rectified and is used to drive a relay circuit that is energized when the voltage level reaches a predetermined value. Alternatively, the rectified output voltage may be used to operate a meter or other indicating device. A device of the foregoing type is illustrated in U.S. Reissue Pat. No. 25,977 (Rosso—1966).

Although devices of the foregoing type have been somewhat useful for certain applications, they have been deficient in sensitivity, linearity, temperature stability, and the ability to detect changes in capacitance that occur over a wide range of values.

It has been surprisingly discovered that each of the foregoing qualities lacking in the prior art devices may be achieved by providing a reference capacitor for use in connection with the probe capacitor and a switch means that cyclically charges and discharges the reference and probe capacitors. The cyclical charging and discharging of the probe capacitor produces a first current that depends on the capacitance value thereof. A second independent current is created by the charging and discharging of the reference capacitor. As the capacitance of the probe is altered due to changes in the level of the substance being measured, the magnitude of the first current is varied accordingly. Since the reference capacitor is not affected by level changes in the tank, the second current remains relatively constant. By comparing the first and second currents, the relative change in probe capacitance due to changes in tank level may be measured with a degree of accuracy, sensitivity, and linearity unattained by prior art devices. Moreover, environmental factors such as changes in temperature and line voltage have an insignificant effect on the operation of the invention during normal usage.

Accordingly, it is a primary object of the present invention to provide a level-detecting device in which the capacitance of a probe capacitor is compared with the capacitance of a reference capacitor.

It is another related object of the present invention to provide a device of the foregoing type in which the probe capacitor and reference capacitor are periodically charged and discharged.

It is yet another object of the present invention to provide means for producing currents the magnitude of which are respectively related to the capacitances of the probe and reference capacitors.

It is yet another object of the present invention to provide a device of the foregonig type in which the currents produced by the charging and discharging of the probe and reference capacitors are compared in order to determine the relative capacitance of the probe and reference capacitors.

Yet another object of the present invention is to provide a device of the foregoing type in which the sensitivity thereof may be adjusted without altering the minimum output current produced by the device.

DESCRIPTION OF THE DRAWINGS

These and other objects and advantages of the present invention will be pointed out for purposes of illustration, but not of limitation, in the accompanying drawings in which like reference numerals refer to like parts throughout, and in which:

FIG. 2 is a block diagram, schematic drawing of a preferred form of capacitance-measuring device made in accordance with the present invention and intended for use in connection with the probe capacitor illustrated in FIG. 1 or FIG. 1a;

DESCRIPTION OF THE PREFERRED EMBODIMENTS

Figure 1A:
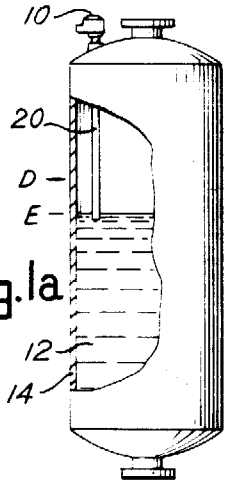
FIG. 1a illustrates a preferred means of vertically mounting the probe capacitor shown in FIG. 1 for two-point and single-point control applications.
Figure 1:
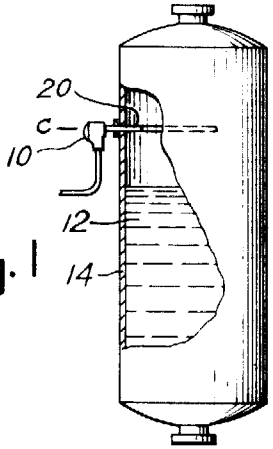
FIG. 1 illustrates a preferred means of horizontally mounting a probe capacitor used in connection with the present invention.

As best shown in FIG. 1 and FIG. 1a, a capacitance-measuring circuit 10 made in accordance with the present invention may be used to indicate or control the level of a liquid 12 held in a tank 14. The tank is fitted with a probe capacitor 20 which has a capacitance that depends on the presence or absence of liquid surrounding the probe. The probe may be mounted either vertically or horizontally. A capacitance-measuring circuit 10 is mounted on the probe capacitor in order to detect any changes in the capacitance thereof, thereby indicating whether the liquid level is above or below a set point level such as level C.

Figure 2:
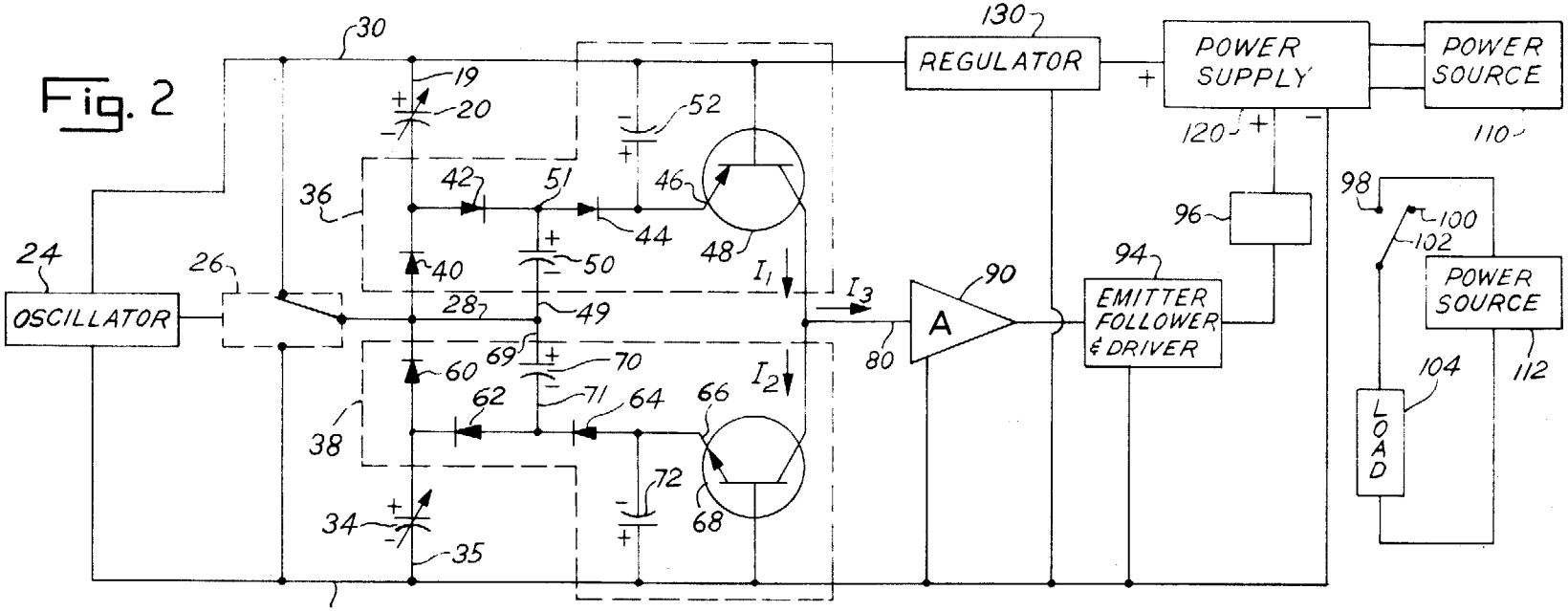

Referring to FIG. 2, a preferred form of capacitance-measuring circuit 10 basically comprises an oscillator 24 that operates a switch 26 at a predetermined rate, such as 200 kilocycles. Switch 26 alternately applies to a conductor 28, a positive supply voltage from a conductor 30 or a negative supply voltage from a conductor 32. The operation of switch 26 alternately charges and discharges probe capacitor 20, a reference capacitor 34, and certain components of detecting circuits 36 and 38 (indicated by dotted lines).

Detecting circuit 36 is used to produce a current $I_1$ (flowing in the direction indicated) that is proportional to the change of voltage created across capacitor 20 due to the cyclical charging and discharging thereof. The circuit comprises diodes 40, 42, and 44 that are connected in series between conductor 28 and an emitter lead 46 of an amplifier transistor 48. The circuit also includes a capacitor 50 having terminals 49 and 51 connected between conductor 28 and the junction of diodes 42 and 44, and a capacitor 52 that is connected between a base lead and the emitter lead 46 of transistor 48 (i.e., between the input terminals of transistor 48).

Detecting circuit 38 produces a current $I_2$ (flowing in the direction indicated) that is proportional to the change of voltage created across capacitor 34 due to the cyclical charging and discharging thereof. The circuit comprises diodes 60, 62, and 64 that are connected in series between conductor 28 and an emitter lead 66 of an amplifier transistor 68. The circuit also includes a capacitor 70 having terminals 69 and 71 connected between conductor 28 and the junction of diodes 62, 64, and a capacitor 72 that is connected between a base lead and the emitter lead 66 of transistor 68 (i.e., between the input terminals of transistor 68).

The collector leads of transistors 48 and 68 are connected through a conductor 80 to an amplifier 90. As a result, current $I_3$ (flowing in the direction indicated) in conductor 80 represents the difference between the magnitude of current $I_1$ flowing in the collector lead of transistor 48 and current $I_2$ flowing in the collector lead of transistor 68. Current $I_3$ is amplified in amplifier 90 and is passed through an emitter follower and driver arrangement 94 to the coil of a relay 96. Relay 96 has contacts 98, 100, and a contact arm 102. Contact arm 102, in turn, is connected through a load 104 to a power source 112. Load 104 preferably comprises an indicating device as a light bulb.

Power is supplied to the circuit through a source of AC power 110. The AC power is converted to DC current in power supply 120 and is maintained at a predetermined value by a regulator 130. A DC power source may be used to replace the AC power source 110 and the power supply 120.

The operation of the apparatus shown in FIG. 2 is described as follows. Basically, switch 26 is used to simutlaneously charge capacitor 20 and discharge capacitor 34, and conversely to simultaneously charge capacitor 34 and discharge capacitor 20 on alternate cycles of operation. The charging and discharging of the capacitors creates corresponding current that charge capacitors 52 and 72 until the forward conducting voltage across the emitter to base junction of transistors 48 and 68, respectively, is reached. Transistors 48 and 68 then conduct and establish currents $I_1$ and $I_2$ in their respective collector leads. The magnitudes of currents $I_1$ and $I_2$ depend on the capacitance of probe capacitor 20 and reference capacitor 34, respectively.

In order to adjust the circuit, the level of liquid in tank 14 is raised to an adjustment level at the midpoint of probe 20 (i.e., to level C, FIG. 1) or to any desired adjustment level on a vetrical probe such as level D, (FIG. 1a). Capacitor 34 is then adjusted so that it is equal in magnitude to capacitor 20. As a result, currents $I_1$ and $I_2$ are substantially equal and current $I_3$ has a low value that is insufficient to operate relay 96. If the level of liquid decreases, $I_1$ decreases and current $I_3$ becomes negative. However, as soon as the level increases above the adjustment level, the capacitance of probe 20 becomes slightly greater than the capacitance developed during adjustment, and current $I_1$ thereby increases. The extreme sensitivity of the circuit enables current $I_1$ to be significantly increased even though the capacitance of probe 20 increases by only about .01 picofarad. An increase in current $I_1$ also increases current $I_3$. Accordingly, current $I_3$ is amplified by amplifier 90 to operate relay 96, and load 104 is connected to the power source 112 through contact 98 when the liquid in tank 14 rises slightly above the adjustment level.

The foregoing mode of operation is achieved when terminal 19 of capacitor 20 is connected to the positive supply voltage and teminal 35 of capacitor 34 is connected to the negative supply voltage. However, it should be noted that the same basic mode of operation may be achieved when terminal 19 is connected to any source of positive or negative DC voltage within the breakdown limits of the components. Likewise, terminal 35 may be connected to any source of positive or negative DC voltage without altering the overall operating charatceristics of the circuitry. The probe and reference capacitors may be connected in the manner described as long as an AC bypass path is provided between the DC voltage supply terminals to which the subject capacitors are connected.

The operation of detecting circuit 36 and probe capacitor 20 will now be described in more detail assuming that switch 26 is connecting conductor 28 to negative supply conductor 32. With switch 26 in the position described, diodes 40 and 44 are reverse biasesd and capacitors 20 and 50 are charged through diode 42. Since capacitor 50 is normally at least 100 times larger than capacitor 20, most of the voltage drop during the charging process occurs across capacitor 20. Accordingly, capacitor 50 is charged to a relatively small positive voltage that depends on the relative capacitance of the two capacitors.

When switch 26 is reversed so that it connects conductor 28 to conductor 30, the positive supply voltage is conducted to capacitor 20 through diode 40 and is directly conducted to terminal 49 of capacitor 50.

Since the voltage on terminal 49 of capacitor 50 changes by the magnitude of the supply voltage as the switch reverses, the voltage at terminal 51 of capacitor 50 changes by a like amount. Accordingly, when the switch is reversed in the manner described, the voltage at terminal 51 increases by the magnitude of the supply voltage plus the magnitude of the voltage to which capacitor 50 was previously charged. The change in voltage at terminal 51 forward biases diode 44 and transfers a quantity of charge to capacitor 52. As the switch is reversed during succeeding cycles of operation, capacitor 52 continues to charge in the foregoing manner until the forward conducting voltage of the emitter-base junction of transistor 48 is attained. Thereafter, transistor 48 begins to conduct and produces current $I_1$ that is proportional to the change of voltage created across capacitor 20 during each charging and discharging cycle thereof.

The magnitude of current $I_1$ ultimately depends on the capacitance value of capacitor 20. For example, if the capacitance of capacitor 20 increases, the voltage to which capacitor 50 is charged increases and the voltage to which terminal 51 is raised when the switch connecting conductors 28 and 30 is increased accordingly. As a result, capacitor 52 tends to be charged to a higher voltage and transistor 48 conducts more current through its collector lead (i.e., current $I_1$ increases).

The operation of detecting circuit 38 and reference capacitor 34 will now be described in detail assuming that switch 26 is connecting conductor 28 to positive supply conductor 30. With switch 26 in the position indicated, diodes 60 and 64 are reverse biased and capacitors 70 and 34 are charged through diode 62. Since capacitor 70 is normally at least 100 times larger than capacitor 34, most of the voltage drop during the charging process occurs across capacitor 34, and terminal 71 of capacitor 70 is charged to a relatively high voltage (i.e., a voltage relatively close to the positive supply voltage). When switch 26 is reversed so that conductor 28 is connected to conductor 32, the voltage on terminal 69 of capacitor 70 is reduced by the amount of the supply voltage and the voltage at terminal 71 is reduced by a like amount. The negative supply voltage is also effectively connected to capacitor 34 through forward biased diode 60. Since terminal 71 was already charged to a voltage slightly below the positive supply voltage, the operation of the switch reduces the instantaneous voltage at terminal 71 to a voltage lower than the negative supply voltage. As a result, diode 64 is forward biased and a quantity of charge is removed from capacitor 72. During succeeding operating cycles of switch 26, additional charge is removed from capacitor 72 until the voltage on emitter lead 66 equals the forward emitter-base voltage of transistor 68. Thereafter, transistor 68 conducts and current $I_2$ is established in the collector lead thereof. Since the capacitance of reference capacitor 34 remains relatively constant, the magnitude of current $I_2$ does not appreciably change after it has reached its steady state value.

The circuit is adjusted in the manner previously described. Thereafter, if the liquid level rises slightly above the adjustment level, the capacitance of probe 20 becomes slightly greater than the capacitance of capacitor 34, and currents $I_1$ and $I_3$ increase. Current $I_3$ is then amplified and used to activate relay 96. When relay 96 is activated, arm 102 is moved into contact with contact 98 so that load 104 is connected to the power source 112.

When capacitors 20 and 34 are substantially equal, any variations in the forwarding conducting voltage drop across diodes 40, 42, and 44 due to temperature variation is balanced by a similar voltage drop across diodes 60, 62, and 64. Since the liquid level is detected when capacitor 20 is only slightly larger than capacitor 34, the circuit achieves remarkable temperature stability.

When the liquid has receded below the adjustment level, the capacitance of probe 20 decreases and the magnitude of currents $I_1$ and $I_3$ are reduced accordingly. Relay 96 is then deenergized and the load is disconnected from the power source 112.

The power source 112 may be connected to contact 100 instead of contact 98 to achieve reversal of load activation.

The apparatus described in FIG. 2 offers a number of advantages. The apparatus is capable of detecting very small capacitance differences between capacitors 20 and 34, and is therefore extremely accurate. Moreover, the apparatus is capable of operating under adverse environmental conditions since variations in the frequency of the oscillator or the line voltage have very little effect on the operating characteristics. The portions of the apparatus shown in block diagram form in FIG. 2 are illustrated in more detail in FIG. 3.

In order to fully disclose the circuit illustrated in FIG. 3, specific values for the components thereof will be identified in the following chart.

CHART OF VALUES OF COMPONENTS SHOWN IN FIG. 3

| | |
|---|---|
| **Oscillator 24:** | |
| Transistor **140** | Type 2N3710. |
| Resistor **141** | 2.2K ohms. |
| Resistor **142** | 2.2K ohms. |
| Resistor **143** | 4.7K ohms. |
| Inductor **144** | 1200 microhenries. |
| Inductor **145** | 4700 microhenries. |
| Capacitor **146** | 0.01 microfarad. |
| Capacitor **147** | 200 picofarads. |
| Capacitor **148** | 100 picofarads. |
| **Switch 26:** | |
| Transistor **150** | Type 2N3710. |
| Transistor **151** | Type 2N4061. |
| Probe capacitor **20**: Stainless steel construction having a capacitance of 15–530 picofarads. | |
| Capacitor **160**—0.1 microfarad | |
| Capacitor **161**—0.1 microfarad | |
| **Reference capacitor 34:** | |
| Capacitor **164** adjustable from 0–500 picofarads | |
| Capacitor **165** adjustable from 0–60 picofarads | |
| **Detecting circuit 36:** | |
| Diode **40** | Type 1N914A. |
| Diode **42** | Type 1N914A. |
| Diode **44** | Type 1N914A. |
| Capacitor **50** | 0.1 microfarad. |
| Capacitor **52** | 0.1 microfarad. |
| Transistor **48** | Type 2N4061. |
| Resistor **168** | 1K ohms. |
| **Detecting circuit 38:** | |
| Diode **60** | Type 1N914A. |
| Diode **62** | Type 1N914A. |
| Diode **64** | Type 1N914A. |
| Diode **170** | 4.7 volt Zener Type. |
| Capacitor **70** | 0.1 microfarad. |
| Capacitor **72** | 0.1 microfarad. |
| Transistor **68** | Type 2N3710. |
| **Amplifier 90:** | |
| Transistor **172** | Type 2N4061. |
| Transistor **174** | Type 2N4061. |
| Resistor **176** | 150K ohms. |
| Resistor **178** | 15K ohms. |
| Resistor **180** | 47K ohms. |
| Resistor **182** | 15K ohms. |
| Resistor **184** | 47K ohms. |
| Capacitor **186** | 0.1 microfarad. |
| **Emitter follower 94:** | |
| Transistor **190** | Type 2N3710. |
| Transistor **192** | Type 2N1711. |
| Resistor **194** | 15K ohms. |
| Resistor **196** | 22K ohms. |
| Capacitor **198** | 43 microfarads. |
| **Power supply 120:** | |
| Diode **200** | Type 1N645. |
| Diode **202** | Type 1N645. |
| Resistor **204** | 1K ohms. |
| Capacitor **206** | 43 microfarads. |
| **Regulator 130:** | |
| Capacitor **208** | 4.7 microfarads. |
| Diode **210** | 15 volt Zener Type. |

Figure 3:
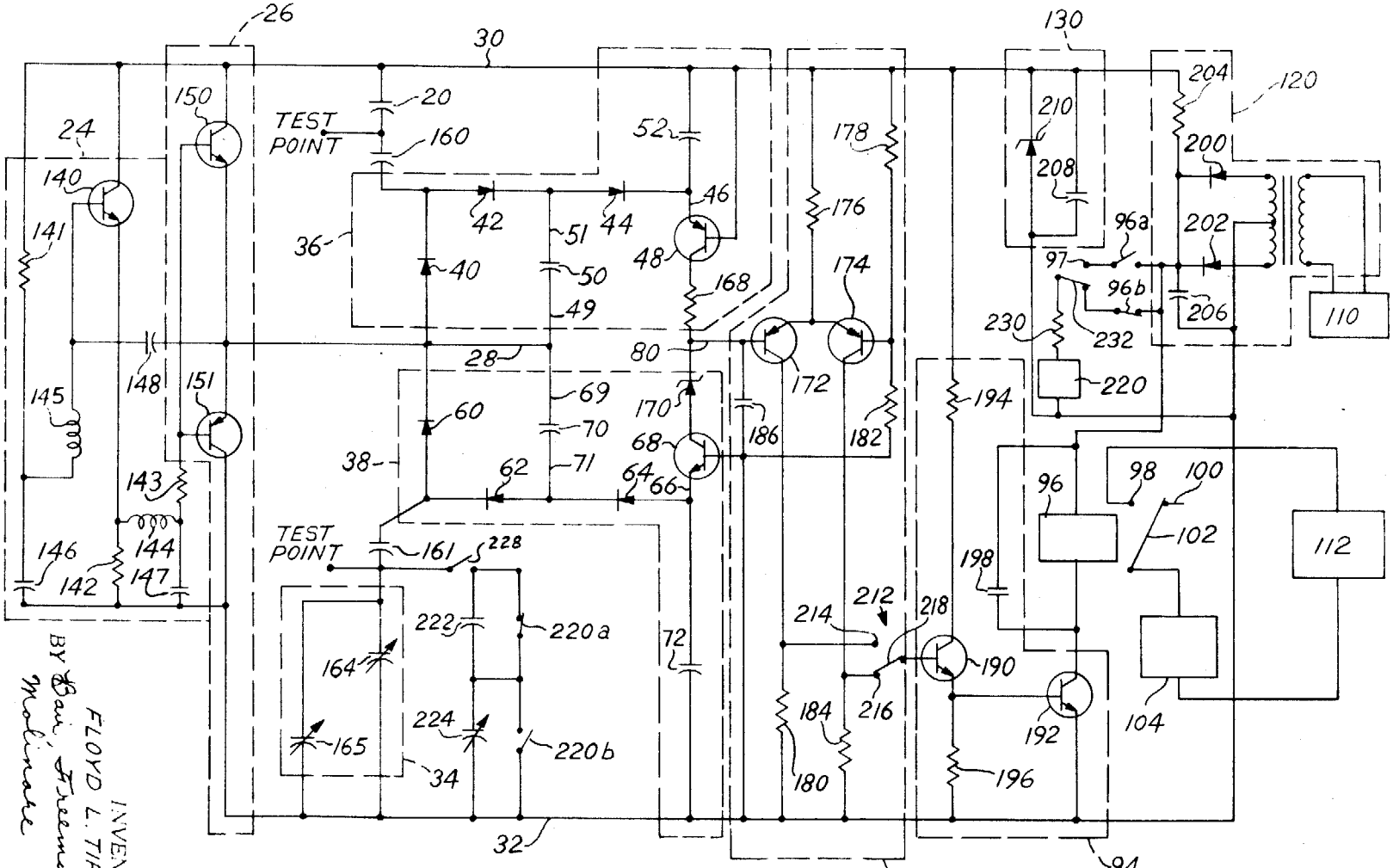
FIG. 3 is a detailed schematic drawing of the device shown in FIG. 2, together with an additional control circuit.

With reference to FIG. 3, oscillator 24 uses a transistor 140 with an inductance-capacitance feedback network. The oscillator operates a switch 26 comprising transistors 150 and 151. When transistor 150 is conducting, conductor 28 is effectively connected to positive supply conductor 30, and conversely, when transistor 151 is conducting, conductor 28 is effectively connected to the negative supply conductor 32.

Capacitors 160 and 161 are included in the circuit to provide DC isolation of the probe and reference capacitors for safety considerations. Since capacitors 160 and 161 are much larger in value than the probe and reference capacitors and are in series therewith, their effect on circuit operation and performance is negligible.

Detecting circuits 36 and 38 were described in detail in connection with FIG. 2. However, the more detailed illustration in FIG. 3 also includes a resistor 168 that limits the current flow in transistors 48 and 68, and a Zener diode 170 that maintains the base of transistor 172 at a positive voltage in order to prevent excessive saturation.

Amplifier 90 basically comprises a difference amplifier including transistors 172 and 174. The collectors of these transistors are connected to a switch 212 that includes a terminal 214, a terminal 216, and an arm 218 that operates between the terminals. When the arm is in the position shown in FIG. 3, the apparatus is in its fail-safe low-level mode and operates in the manner described in connection with FIG. 2. That is, relay 96 is energized when the liquid in tank 14 exceeds the adjustment level, and is deenergized when the liquid is below the adjustment level. However, when arm 218 is moved into contact with terminal 214, the apparatus is in its fail-safe high-level mode. In this mode of operation, relay 96 is energized when the liquid in tank 14 is below the adjustment level, and is deenergized when the liquid exceeds the adjustment level.

The operation of emitter follower and driver 94, power supply 120, and regulator 130 will be readily understood by those skilled in the art by reference to FIG. 3.

The apparatus described in FIG. 3 may be adapted to provide a two-point control system by moving switch 228 to its closed position and by relocating probe 20 in a vertical position as shown in FIG. 1a. By placing probe 20 in the position indicated, the level of liquid in tank 14 may be mantained between any two levels such as levels D and E.

When switch 228 is in the closed position, capacitors 222 and 224 are interconnected with the circuit in the manner shown in FIG. 3. Capacitor 224 preferably comprises fine and coarse adjustable capacitors that may be varied up to about 560 picofarads. Capacitor 222 has a value that equals (or slightly exceeds) the minimum capacitance to which capacitor 224 can be adjusted (generally about 6–7 picofarads). The operation of capacitors 222 and 224 is controlled by contacts 220a and 220b, respectively, that are, in turn, operated by relay coil 220. Relay coil 220 is energized through a resistor 230, a switch 232 (that is ganged with switch 212), and contacts 96a and 96b that are operated by relay coil 96. Switch 232 is shown in its fail-safe low-level position and may be moved to a fail-safe high-level position in contact with terminal 97. When transistor 192 is in its nonconductive state (i.e., when relay coil 96 is deenergized), relay contacts 220a, 220b, 96a, and 96b are located in the positions shown in FIG. 3. That is, contacts 220a and 96b are closed and contacts 220b and 96a are open, when switches 212 and 232 are in the positions shown in FIG.3.

Liquid 12 is maintained between levels D and E as follows. Assuming relay coil 96 is deenergized as the liquid level rises toward level D from the position shown, coil 220 is energized through closed contact 96b. As a result, contact 220a is closed and contact 220b is open, thereby short-circuiting and disabling capacitor 222 and placing variable capacitor 224 in parallel with reference capacitor 34. Capacitor 224 is adjusted so that the combined capacitances of capacitors 34 and 224 substantially equal the capacitance of the probe when the liquid rises to level D. As the liquid reaches level D, relay 96 is energized in the manner previously described, and relay coil 220 is deenergized. Accordingly, relay contact 220a is opened and contact 220b is closed so that capacitor 224 is short-circuited and disabled, and capacitor 222 is connected in parallel with capacitor 34. At the same time, load 104 is connected to the power source 112 through contact 98 in order to perform a control function that begins to decrease the level of liquid in the tank. Since capacitor 222 has a relatively small value, the capacitance of the probe is much greater than the capacitance of capacitors 34 and 222 combined, as long as the liquid remains near level D. As a result, relay 96 continues to be energized.

As the level of liquid in the tank decreases, relay 96 continues to be energized until the probe capacitance becomes less than the capacitance of capacitors 34 and 222 combined. Capacitor 34 is adjusted so that this condition is met at level E. When the probe capacitor has decreased in value in the manner indicated, relay 96 is deenergized in the manner previously described and relay 220 is again energized to establish the conditions initially described. In addition, load 104 is again disconnected from the power source 112 in order to perform a control function that raises the level of liquid in the tank.

Due to the unique arrangement of relay contacts 220a and 220b, the difference between the upper and lower levels of liquid maintained in tank 14 may be very small. Normally, this mode of operation would be impossible since capacitor 224 could not be adjusted to have a zero capacitance. Adjustable capacitors inherently exhibit a few picofarads of capacitance between their input and output terminals irrespective of the manner in which they are adjusted. As a result, the minimum difference in liquid levels that the system could maintain would be dictated by the inherent capacitance of capacitor 224. This difficulty is eliminated by relay contact 220b that short-circuits capacitor 224 during a portion of the operating cycle and by capacitor 222 that has a value equal to the minimum capacitance of capacitor 224. As a result, the capacitance value connected in parallel with capacitor 34 can be approximately equal whether the liquid is rising or falling, so that the liquid level can be controlled within a small differential between levels D and E.

Figure 4:
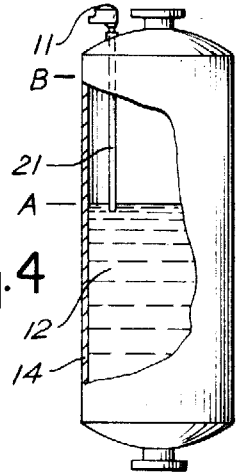
FIG. 4 illustrates a preferred means of vertically mounting a probe capacitor used in connection with the present invention for proportional control or indication.

The present invention may also be adapted to continuously indicate the precise level of liquid stored in a tank. An example of such usage is illustrated in FIG. 4 wherein the precise level of liquid 12 between positions A and B is sensed by a vertically oriented probe capacitor 21. As the liquid rises from level A to level B, the capacitance of probe 21 is increased, and a capacitance-measuring circuit 11 produces an output signal that is proportional to the change in capacitance. The output signal may be conducted through a meter that continuously indicates the level of the liquid, or through a control device that continuously adjusts the level of liquid in the tank.

Figure 5:
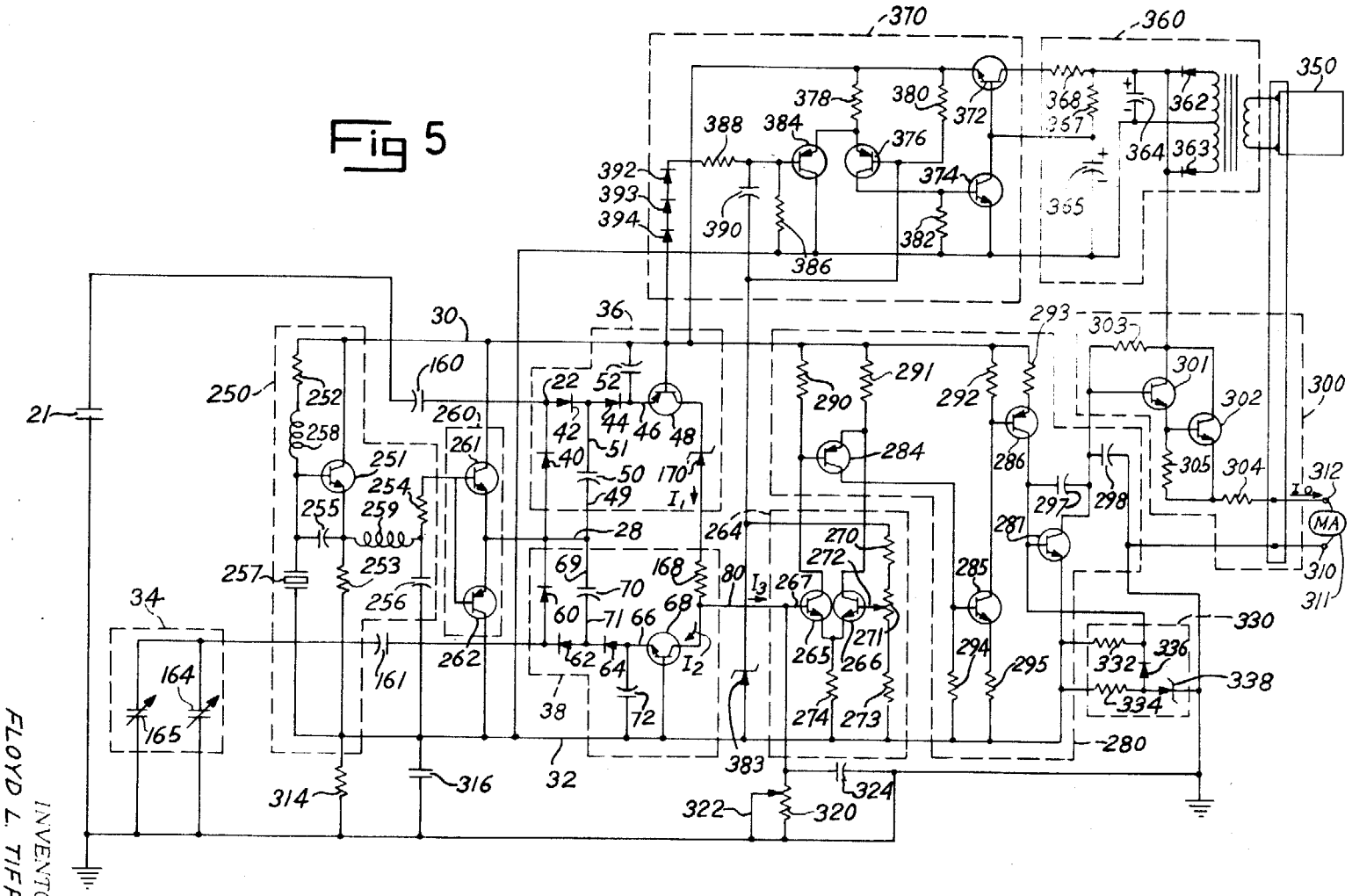
FIG. 5 is a detailed schematic drawing of a capacitance-measuring device made in accordance with the present invention and intended for use in connection with the probe capacitor illustrated in FIG. 4.

A circuit of the foregoing type made in accordance with the present invention is illustrated in detail in FIG. 5. In order to fully describe the circuit, values are assigned to the components identified in FIG. 5 according to the following chart.

CHART OF VALUES OF COMPONENTS SHOWN IN FIG. 5

| | |
|---|---|
| Oscillator 250: | |
| Resistor 251 | Type 2N3710. |
| Resistor 252 | 220K ohms. |
| Resistor 253 | 2.2K ohms. |
| Resistor 254 | 4.7K ohms. |
| Capacitor 255 | 0.01 microfarad. |
| Capacitor 256 | 180 picofarads. |
| Crystal 257 | Designed to operate at about 200 kilohertz. |
| Inductor 258 | 33 millihenries. |
| Inductor 259 | 1.5 millihenries. |
| Switch 260: | |
| Transistor 261 | Type T1S60M. |
| Transistor 262 | Type T1S61M. |

Detecting circuits 36 and 38.—All components are identical to the corresponding components shown in FIG. 3 except as follows: Diode 170'—13 volt Zener Type Difference amplifier 264:
- Transistor 265 ..... Type 2N3707.
- Transistor 266 ..... Type 2N3707.
- Resistor 270 ..... 3.32K ohms.
- Resistor 271 ..... 2K ohm potentiometer.
- Resistor 273 ..... 1K ohms.
- Resistor 274 ..... 47K ohms.

Amplifier 280:
- Transistor 284 ..... Type 2N4061.
- Transistor 285 ..... Type 2N3710.
- Transistor 286 ..... Type 2N4061.
- Transistor 287 ..... Type 2N1711.
- Resistor 290 ..... 100K ohms.
- Resistor 291 ..... 100K ohms.
- Resistor 292 ..... 100K ohms.
- Resistor 293 ..... 15K ohms.
- Resistor 294 ..... 47K ohms.
- Resistor 295 ..... 4.7K ohms.
- Capacitor 297 ..... 0.25 microfarad.
- Capacitor 298 ..... 4.7 microfarads.

Emitter follower 300:
- Transistor 301 ..... Type 2N1711.
- Transistor 302 ..... Type 2N3054.
- Resistor 303 ..... 22K ohms.
- Resistor 304 ..... 75 ohms for 4 to 20 milliamps output current.
- Resistor 305 ..... 15K ohms.

Load components:
- Resistor 315 ..... 510 ohms for 4 to 20 milliamps output current.
- Capacitor 316 ..... 43 microfarads.

Feedback resistor 320—10,000 ohms.

Capacitor 324—0.1 microfarad.

Overload protection circuit 330:
- Resistor 332 ..... 22K ohms.
- Resistor 334 ..... 1K ohm.
- Diode 336 ..... Type 1N461
- Diode 338 ..... 13 volt Zener type.

Power source 350—120 volt, 50 or 60 cycle AC

Power Supply 360:
- Diode 362 ..... Type 1N645.
- Diode 363 ..... Type 1N645.
- Capacitor 364 ..... 43 microfarads.
- Capacitor 365 ..... 4.7 microfarads.
- Resistor 367 ..... 10K ohms.
- Resistor 368 ..... 300 ohms.

Regulator 370:
- Transistor 372 ..... Type 2N3054.
- Transistor 374 ..... Type 2N3710.
- Transistor 376 ..... Type 2N4061.
- Resistor 378 ..... 47K ohms.
- Resistor 380 ..... 2K ohms.
- Resistor 382 ..... 47K ohms.
- Diode 383 ..... Type 1N821.
- Transistor 384 ..... Type 2N4061.
- Resistor 386 ..... 4.99 K ohms.
- Resistor 388 ..... 13.3K ohms.
- Capacitor 390 ..... 0.25 microfarads.
- Diode 392 ..... Type 1N461.
- Diode 393 ..... Do.
- Diode 394 ..... Do.

Referring to FIG. 5, a preferred form of the present invention capable of measuring changes in the capacitance of probe capacitor 21 basically comprises an oscillator 250, a switch circuit 260, detecting circuits 36 and 38, a reference capacitor 34, a difference amplifier 264, an amplifier 280, an emitter follower circuit 300, a feedback resistor 320, an overload protection circuit 330, a power source 350, a power supply 360, and a regulator 370.

Oscillator 250 is controlled by a crystal 257 that is designed to operate at 200 kilocycles over a wide range of temperatures.

Switch 260 and detecting circuits 36 and 38 are constructed in a manner similar to the corresponding components shown in FIG. 3 and may be understood with reference thereto.

Difference amplifier 264 includes a unique balancing circuit used in connection with transistor 266 that enables the adjustment of the maximum output current without affecting the adjustment of the minimum output produced by the circuit (at terminals 310 and 312).

Amplifier 280 increases the magnitude of the signal produced by transistor 265 and emitter follower circuit 300 impedance-matches the signal to the load connected between output terminals 310 and 312. In the present embodiment of the invention, the load consists of a DC milliammeter that indicates the level of liquid held in tank 14, and a resistor 314 that is connected between the negative side of the load and the negative supply conductor 32.

Overload protection circuit 330 comprises a unique arrangement of components whereby excessive current is prevented from flowing through the load. As soon as the current through the load is reduced to a safe level, the overload protection circuit automatically resets, and the entire circuit is returned to its normal mode of operation.

Regulator 370 comprises a conventional series regulating circuit including transistors 372, 374, 376, and 384, and a unique temperature compensating circuit that utilizes the forward conducting voltaged drop of diodes 392–394. These diodes compensate for changes in the forward conducting voltage drop across the diodes in detecting circuits 36 and 38 due to temperature changes. The entire arrangement results in a capacitance-measuring circuit that is extremely stable over wide ranges of temperature variations.

The operation of the apparatus illustrated in FIG. 5 will now be discussed in detail. Oscillator 250 produces a 200 kilocycle signal that operates switch 260 in a manner described in connection with FIG. 3. That is, during the positive half-cycle of the signal produced by oscillator 250, transistor 261 conducts current so that conductor 28 is effectively connected to the positive supply conductor 30. Conversely, on the negative half-cycle of the signal produced by oscillator 250, transistor 262 conducts so that conductor 28 is effectively connected to the negative supply conductor 32.

The operation of detecting circuits 36 and 38 are somewhat different from the analogous circuits shown in FIG. 3 due to the slight change in the manner in which probe capacitor 21 and reference capacitor 34 are connected. However, the overall effect of the operation is the same.

The operation of detecting circuit 36 will be explained assuming that switch 260 is operated so that conductor 28 is effectively connected to the negative supply conductor 32. With switch 260 operated in the manner indicated, diodes 40 and 44 are reverse biased and the charge maintained at terminal 22 of detecting circuit 36 is discharged along two paths. The first path extends from terminal 22 over capacitor 160, probe capacitor 21, and the parallel combination of resistor 314 and capacitor 316 to the negative supply. The second path extends over diode 42, capacitor 50, and switch 260 to the negative supply. The charge built up at terminal 22 due to preceding cycles of operation is discharged along the described paths, the resulting voltage across capacitor 50 depending primarily on the relative values of the capacitors in the paths. For example, if the capacitance of probe capacitor 21 is increased, charge is held at terminal 22 for a longer period of time during the discharge cycle so that the voltage retained across capacitor 50 increases.

Assuming the switch is reversed so that conductor 28 is effectively connected to conductor 30, the positive supply voltage is directly connected to terminal 49 of capacitor 50 and is connected to terminal 22 through diode 40. Accordingly, as the switch reverses, capacitor 21 begins to charge and the voltage on terminal 49 changes by the amount of the supply voltage. As a result, the voltage at terminal 51 increases by a like amount so that the total instantaneous voltage present at terminal 51 approximately equals the supply voltage plus the voltage retained on capacitor 50 during the discharge portion of the operating cycle. The increased voltage at terminal 51 forward biases diode 44 so that capacitor 52 receives a quantity of charge. During succeeding cycles of operation, capacitor 52 receives additional charge until the voltage across the capacitor equals the forward conducting voltage of the emitter-base junction of transistor 48. Transistor 48 then conducts in order to produce current $I_1$. Those skilled in the art will appreciate that the steady state magnitude of $I_1$ ultimately depends on the change of voltage across probe capacitor 21 due to the charging and discharging thereof. This voltage change, in turn depends on the relative capacitance of probe capacitor 21.

The operation of detecting circuit 38 will now be explained assuming that switch 260 is effecively connecting conductor 28 to the positive supply conductor 30. When switch 260 is operated in the manner indicated, diodes 60 and 64 are reverse biased, and reference capacitor 34 and capacitor 70 are charged through diode 62, capacitor 161, and the parallel combination of resistor 314 and capacitor 316. Since capacitor 70 is at least 100 times larger than capacitor 34, most of the voltage drop due to the charging of the capacitors occurs across capacitor 34. As a result, terminal 71 of capacitor 70 is charged to a voltage slightly lower than the positive supply voltage. Assuming switch 260 is reversed so that conductor 28 is effectively connected to conductor 32, the charge held on capacitor 34 is discharged through diode 60 and the voltage on terminal 69 of capacitor 70 is instantaneously reduced to the negative supply voltage. Accordingly, the voltage on terminal 71 of capacitor 70 is reduced by a like amount so that the instantaneous resulting voltage on terminal 71 approximately equals the negative supply voltage minus the voltage existing across capacitor 70 during the charging phase of the operating cycle. As a result, diode 64 is forward biased so that a quantity of charge is removed from capacitor 72. During succeeding cycles of operation, additional quantities of charge are removed from capacitor 72 until the voltage across the capacitor equals the forward conducting voltage of the emitter-base junction of transistor 68. Transistor 68 then begins to conduct current $I_2$. As previously stated, $I_2$ is proportional to the change in voltage occurring across the reference capacitor 34 during each cycle of operation. After the capacitance of reference capacitor 34 is initially adjusted, current $I_2$ normally does not change substantially during the operation of the circuit.

It should be noted that the probe and reference capacitors used in the apparatus illustrated in FIG. 5 are simultaneously charged and discharged as switch 260 is reverse. This mode of operation is the converse of the operation exhibited by the apparatus shown in FIG. 3, wherein the probe capacitor is charged as the reference capacitor is discharged and vice versa. It will also be observed that the paths through which the probe and reference capacitors are charged and discharged are somewhate different in the FIG. 3 and FIG. 5 embodiments. Nonetheless, both embodiments achieve the same end result. That is, currents $I_1$ and $I_2$ are proportional to the change in voltage across the probe and reference capacitors, respectively, during each operating cycle.

As in the case of the FIG. 3 embodiment, current $I_3$ flowing in conductor 80 (FIG. 5) equals the difference between currents $I_1$ and $I_2$. Current $I_3$ is amplified in difference amplifier 264 and amplifier 280 in a manner well-known to those skilled in the art. The resulting current is then conducted to an emitter follower arrangement 300. The DC output current then flows through terminal 312, DC milliammeter 311, terminal 310 and load resistor 314 to the negative voltage supply.

The operation of the temperature-compensating section of regulator 370 will now be described in detail. The section compensates for the change in forward conducting voltage drop across the diodes in detecting circuits 36 and 38 due to changes in temperature. Those skilled in the art will appreciate that the forward conducting voltage drop across diodes 40, 42, and 44 decreases with increasing temperature. This decrease in voltage drop has the effect of raising the change of voltage across probe capacitor 21 as the capacitor is charged and discharged. This change of voltage across the probe capacitor can be eliminated by reducing the supply voltage by an appropriate amount.

Assuming an increasing temperature, the supply voltage is reduced by the temperature compensating section of regulator 370 in the following manner. As the temperature increases, the forward conducting voltage drop across diodes 392–394 decreases so that the voltage on the base lead of transistor 384 increases. An increased voltage on its base lead causes transistor 384 to conduct less current. As a result, less current is drawn through resistor 378, and the voltage on the emitter lead of transistor 376 is thereby increased. Transistor 376 then conducts more current, thereby increasing the voltage on the base lead of transistor 374. Transistor 374 conducts additional current so that the voltage on the base lead of transistor 372 is reduced. Transistor 372 then conducts less current so that the voltage at positive supply conductor 30 is reduced. The foregoing operation of regulator 370 results in a circuit that is extremely stable and capable of linear operation over a wide range of temperature.

The apparatus shown in FIG. 5 is adjusted as follows. The level of liquid in tank 14 is reduced to position A, and capacitors 164 and 165 that comprise reference capacitor 34 are adjusted until current $I_3$ attains the minimum value. (Even when the capacitances of the probe and reference capacitors are the same, current $I_3$ will have a small value due to the bias current required in order to operate transistors 48 and 68.) After reference capacitor 34 is adjusted, adjusting arm 272 of potentiometer 271 is adjusted until the base lead 267 of transistor 265 is at ground potential. After the foregoing adjustment is made no current flows through feedback resistor 320, so that its resistance value has no effect on the minimum current produced by the circuit (i.e., the current produced by the circuit when the probe and reference capacitors are approximately equal in capacitance).

When current $I_3$ is adjusted to its minimum value, output current $I_0$ is also at its minimum value. The minimum value of $I_0$ may be adjusted by altering the value of resistor 304 and resistor 314. In the embodiment disclosed herein, current $I_0$ at its minimum value equals approximately 4 milliamps.

Following the foregoing adjustments, the level of liquid in tank 14 is raised to position B and currents $I_1$, $I_3$, and $I_0$ increase as previously described. Arm 322 of resistor 320 is then adjusted until a desired maximum current flows through milliammeter 311. The maximum current may be adjusted to a variety of values (i.e., 20 milliamps). As previously explained, the adjustment of resistor 320 in no way affects the minimum current produced by the circuit when the level of liquid is at positive A. This unique feature enables the circuit to provide a variety of maximum current values without requiring readjustment of the minimum value.

By properly calibrating milliammeter 311 between the maximum and minimum output current values, the circuit produces a continuous indication of the upper level of liquid between positions A and B. Due to the sensitivity and linearity of the circuit shown in FIG. 5, the level is indicated with extreme accuracy over a wide temperature range.

Those skilled in the art will appreciate that the features of the present invention may be used for a number of capacitance-measuring applications other than the detection of changes in liquid levels. For example, by choosing an appropriate probe, the quality of liquid (e.g., moisture content) may also be detected. Moreover, it should be understood that the embodiments shown herein are merely exemplary of the preferred practices of the invention and that additional changes in structure and modes of operation may be achieved without departing from the spirit and scope of the invention.

I claim:

1. In a system for measuring the relative capacitance of a first capacitor, apparatus comprising:

a second reference capacitor;

switch means for cyclically charging and discharging said first capacitor and said second capacitor;

[first detecting means for producing a first current proportional to the change of voltage created across said first capacitor by the cyclical charging and discharging thereof;

second detecting means for producing a second current proportional to the change of voltage created across said second capacitor by the cyclical charging and discharging thereof; and]

*first detecting means for detecting a pulsating signal generated by the cyclical charging and discharging of the first capacitor to produce a first detected signal having a DC value proportional to the capacitance of the first capacitor and for amplifying the first detected signal to produce a first current;*

*second detecting means for detecting a pulating signal generated by the cyclical charging and discharging of the second capacitor to produce a second detected signal having a DC value proportional to the capacitance of the second capacitor and for amplifying the second detected signal to produce a second current; and* comparison means for comparing said first and second currents, whereby the relative capacitance of said first capacitor in relationship to said second capacitor may be determined.

2. [Apparatus as claimed in claim 1, wherein said switch means comprises:] *In a system for measuring the relative capacitance of a first capacitor, apparatus comprising:*

*a second reference capacitor;*

*switch means for cyclically charging and discharging said first capacitor and said second capacitor*[;], *said switch means comprising* a switch that alternately connects said first and second capacitors to a source of positive voltage and a source of negative voltage[;], and an oscilator that operates the switch at a predetermined cyclical rate[.];

*first detecting means for producing a first current proportional to the change of voltage created across said first capacitor by the cyclical charging and discharging thereof;*

*second detecting means for producing a second current proportional to the change of voltage created across said second capactor by the cyclical charging and discharging thereof; and*

*comparison means for comparing said first and second currents, whereby the relative capacitance of said first capacitor in relationship to said second capacitor may be determined.*

3. [Apparatus, as claimed in claim 1, wherein said first detecting means comprises:] *In a system for measuring the relative capacitance of a first capacitor, apparatus comprising:*

*a second reference capacitor;*

*switch means for cyclically charging and discharging said first capacitor and said second capacitor;*

*first detecting means for producing a first current proportional to the change of voltage created across said first capacitor by the cyclical charging and discharging thereof*[;], *said first detecting means comprising,* a first amplifier having first and second input terminals[;], *and* a third capacitor connected between said first and second input terminals for storing a quantity of charge resulting from the change of voltage across said first capacitor so that the first amplifier is enabled to produce said first current[.];

*second detecting means for producing a second current proportional to the change of voltage created across said second capacitor by the cyclical charging and discharging thereof; and*

*comparison means for comparing said first and second currents, whereby the relative capacitance of said first capacitor in relationship to said second capacitor may be determined.*

4. Apparatus, as claimed in claim 3, wherein said first detecting means further comprises:

a fourth capacitor having a first terminal connected to said switch means and also having a second terminal;

a first diode connected between said first capacitor and said second terminal of the fourth capacitor; and a second diode connected between said third capacitor and said second terminal of the fourth capacitor.

5. Apparatus, as claimed in claim 3, wherein said second detecting means comprises:

a second amplifier having first and second input terminals; and a fifth capacitor connected between said first and second input terminals for storing a quantity of charge resulting from the change of voltage across said second reference capacitor so that the second amplifier is enabled to produce said second current.

6. Apparatus as claimed in claim 5, wherein said second detecting means further comprises:

a sixth capacitor having a first terminal connected to said switch means and also having a second terminal;

a third diode connected between said second reference capacitor and said second terminal of the sixth capacitor; and a fourth diode connected between said fifth capacitor and said second terminal of the sixth capacitor.

7. Apparatus, as claimed in claim 6, wherein the first and second amplifiers have similar parameters, wherein the capacitance of said third and fifth capacitors are equal, wherein the capacitances of said fourth and sixth capacitors are equal, wherein the first and third diodes have similar parameters, and wherein the second and fourth diodes have similar parameters.

8. Apparatus, as claimed in claim 6, and further comprising:

a source of positive voltage; and means for [altetring] *altering* the magnitude of said positive voltage in order to compensate for the changes in forward conducting voltage across said diodes due to changes in temperature.

9. [Apparatus, as claimed in claim 1, wherein the comparison means comprises:] *In a system for measuring the relative capacitance of a first capacitor, apparatus comprising:*

*a second reference capacitor;*

*switch means for cyclically charging and discharging said first capacitor and said second capacitor;*

*first detecting means for producing a first current proportional to the change of voltage created across said first capacitor by the cyclical charging and discharging thereof;*

*second detecting means for producing a second current proportional to the change of voltage created across said second capacitor by the cyclical charging and discharging thereof; and*

*comparison means for comparing said first and second currents, whereby the relative capacitance of said first capacitor in relationship to said second capaci-*

*tor may be determined*[.], *said comparison means comprising* means for algebraically summing the first and second currents to produce a third current that represents the difference between said first and second currents;

a third amplifier wherein said third current is amplified to produce an output current; and an indicating device that is operated whenever the output current exceeds a predetermined value.

10. Apparatus, as claimed in claim 9, and further comprising a feedback network connected to said third amplifier, for adjusting the gain of the third amplifier, said feedback network comprising a variable resistor.

11. Apparatus, as claimed in claim 10, and further comprising means for eliminating current flow through said variable resistor when the output current is at a minimum value, so that the gain of the third amplifier may be altered without changing the minimum value of the output current.

12. Apparatus, as claimed in claim 11, wherein said means for eliminating current flow comprises a differential amplifier that includes:

a first amplifying device having an input terminal to which said varaible resistor is attached; and a second amplifier for adjusting the voltage at said input terminal.

13. In a system for maintaining liquid in a tank between a first level and a second level, apparatus comprising in combination:

a first capacitor located in said liquid between the first and second levels, said first capacitor being adapted to change its capacitance in response to the changes in the level of said liquid;

a second reference capacitor;

an adjustable third capacitor;

a fourth capacitor;

first means for adjusting the second capacitor so that the combined capacitance of the second and third capacitors equals the capacitance of the first capacitor when the liquid is at the first level, and for adjusting the second capacitor so that the combined capacitance of the second and fourth capacitors equals the capacitance of the first capacitor when the liquid is at the second level;

second means for disabling the fourth capacitor and interconnecting the third capacitor with the second capacitor when the level of the liquid attempts to recede below the second level; and third means for disabling the third capacitor and interconnecting the fourth capacitor with the second capacitor when the level of the liquid attempts to rise above the first level so that the minimum capacitance to which the third capacitor may be adjusted has no effect on the proximity within which the first and second levels can be maintained.

14. Apparatus, as claimed in claim 13, wherein the fourth capacitor has a value equal to the minimum capacitance to which the third capacitor may be adjusted.

15. Apparatus, as claimed in claim 13, wherein the second and third means each comprise contacts controlled by a relay.

16. Apparatus, as claimed in claim 13, wherein said second means and third means comprise:

switch means for periodically charging and discharging said first, second, third, and fourth capacitors;

fourth detecting means for producing a first current proportional to the change of voltage created across said first capacitor by the charging and discharging thereof;

fifth detecting means for producing a second current proportional to the change of voltage created across whichever of the second, third, or fourth capacitors are charged and discharged by the switch means; and comparison means for comparing the first and second currents.

17. A process for determining the relative difference in capacitance of a first capacitor and a second capacitor comprising the steps of:

cyclically charging and discharging the first capacitor;

[producing a first current proportional to the change of voltage created across the first capacitor due to the charging and discharging thereof;

cyclically charging and discharging the first capacitor;

producing a second current proportional to the change of voltage created across the second capacitor due to the charging and discharging thereof; and]

*detecting a pulsating signal generated by the cyclical charging and discharging of the first capacitor;*

*producing a first detected signal having a DC value proportional to the capacitance of the first capacitor;*

*amplifying the first detected signal to produce a first current;*

*detecting a pulsating signal generated by the cyclical charging and discharging of the second capacitor;*

*producing a second detected signal having a DC value proportional to the capacitance of the second capacitor;*

*amplifying the second detected signal to produce a second current; and* comparing the first current and the second current, whereby the capacitance of the first capacitor in relationship to the second capacitor may be determined.

18. A process as claimed in claim 17, wherein the first and second currents are compared by algebraically adding the magnitudes thereof.

*19. Apparatus, as claimed in claim 1, wherein the first detecting means comprises:*

*a first amplifier having an input terminal;*

*first means for cyclically accumulating a first quantity of charge proportional to the capacitance of the first capacitor to produce a first pulsating signal having a first peak voltage proportional to the value of the first capacitor;*

*first means for cyclically transferring at least a portion of said first quantity of charge to the input terminal of the first amplifier in one direction only; and*

*wherein said second detecting means comprises:*

*a second amplifier having an input terminal;*

*second means for cyclically accumulating a second quantity of charge proportional to the capacitance of the second capacitor to produce a second pulsating signal having a second peak voltage proportional to the value of the second capacitor; and*

*second means for cyclically transferring at least a portion of the second quantity of charge to the input terminal of the second amplifier in one direction only.*

*20. Apparatus, as claimed in claim 19, and further comprising:*

*means for storing at least a portion of the charge transferred by the first means for transferring; and*

*means for storing at least a portion of the charge transferred by the second means for transferring.*

*21. Apparatus, as claimed in claim 20, wherein the first means for transferring comprises a first detector means for detecting the first peak voltage and wherein the second means for transferring comprises a second detector means for detecting the second peak voltage.*

*22. Apparatus, as claimed in claim 21, wherein the first detector means comprises a capacitor and a diode each connected to the input terminal of the first amplifier and wherein the second detector means comprises a capacitor and a diode each connected to the input terminal of the second amplifier.*

*23. Apparatus, as claimed in claim 19, wherein said switch means comprises:*

*a first switch directly connected to a source of a first DC voltage;*

*a second switch directly connected to a source of a second DC voltage; and*

*an oscillator that operates the first and second switches at a predetermined cyclical rate.*

*24. Apparatus, as claimed in claim 23, wherein the first means for cyclically accumulating is connected to the first switch, whereby the first means for cyclically accumulating generates a first peak voltage greater than the first DC voltage during each cycle of switch operation and wherein the second means for cyclically accumulating is connected to the second switch whereby the second means for cyclically accumulating generates a second peak voltage less than the second DC voltage during each cycle of switch operation.*

References Cited

The following references, cited by the Examiner, are of record in the patented file of this patent or the original patent.

UNITED STATES PATENTS

| | | | |
|---|---|---|---|
| 3,378,765 | 4/1968 | Hilsenrath et al. | 324—60 C |
| 3,119,267 | 1/1964 | Bartky | 73—304 C |
| 3,140,608 | 7/1964 | Clark | 73—304 |
| 3,254,333 | 5/1966 | Baunoel | 73—304 |
| 3,295,372 | 1/1967 | Gronner | 73—304 |

HERMAN J. HOHAUSER, Primary Examiner

U.S. Cl. X.R.

73—304 C; 324—60 C